July 5, 1949.　　　　L. A. WHITE　　　　2,474,876
CAM OPERATED CLUTCH

Filed Dec. 26, 1944　　　　　　　　　　2 Sheets-Sheet 1

INVENTOR.
LOYD ALVIN WHITE
BY
H. A. McGrew
ATTORNEY

INVENTOR.
LOYD ALVIN WHITE
BY
ATTORNEY

Patented July 5, 1949

2,474,876

UNITED STATES PATENT OFFICE 2,474,876

CAM OPERATED CLUTCH

Loyd Alvin White, Carlsbad, N. Mex.

Application December 26, 1944, Serial No. 569,716

13 Claims. (Cl. 192—93)

This invention relates to clutches and clutch assemblies, and more particularly to axial type clutches used in bit sharpening machines and the like.

Many clutches which have proved satisfactory for use in other types of machines have proved quite troublesome and undesirable when subjected to the heavy use and relatively difficult operating conditions when utilized in apparatus such as that used for sharpening cutting bits for mining machines, for instance. In such apparatus, the bit sharpening hammers must be actuated within an exceedingly short time after the clutch is engaged, since the bits are heated to a desired temperature and the forging or sharpening operation must begin immediately to achieve an efficient operation. Also, full load is imposed upon the drive for the machine with the first blow and should be carried without possibility of slippage until the sharpening is completed. Thus, initial and terminal slippage as well as intermediate slippage should be reduced to a minimum. However, axial type clutches previously in use tend to lose effectiveness upon slight wear of the friction discs, which results in further wear due to increased slippage under pressure, and a resultant lack of achievement of the above desiderata.

Among the objects of this invention are to provide a clutch or clutch assembly which effects a relatively quick starting and stopping of the driven machine; to provide a clutch which is positive in engagement and also positive in transmission throughout engagement of the clutch; to provide such a clutch which is easy to control; to provide such a clutch in which the transmission effectiveness is not affected by slight wear of the clutch discs; to provide such a clutch which is readily adjustable for wear or different operating conditions; to provide such a clutch in which worn parts are readily replaced; to provide such a clutch which is ready for instant use; to provide such a clutch which is relatively simple in operation and which requires little attention on the part of the operator.

Other objects and the novel features of this invention will become apparent from the following description, taken with reference to the accompanying drawings, in which.

Figure 3:
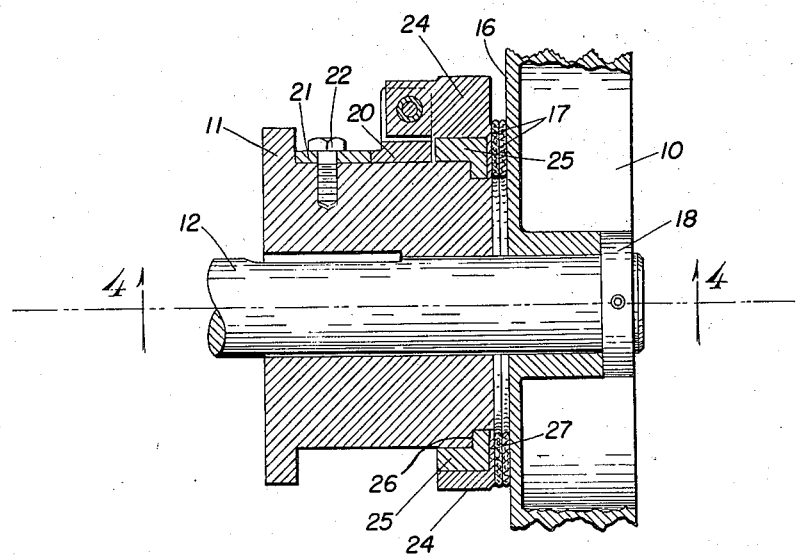
Fig. 3 is a vertical section taken along line 3—3 of Fig. 2.

As illustrated in the drawings, a clutch assembly constructed in accordance with this invention is adapted to control the drive between a driving element, such as a pulley 10, and a driven element, such as a clutch cylinder 11. Cylinder 11 is keyed to a shaft 12 which drives the hammers of a bit sharpening machine, and pulley 10 may be driven directly or indirectly from any suitable source of power, as by V-belts 13 which engage notches in the outer periphery of pulley 10 and a drive pulley 14. Pulley 14 is keyed to a shaft 15, which may be a line shaft, the shaft of a motor in case of direct drive, the low speed shaft of a gear reduction set, or the like. The drive element or pulley 10 provides, as in Figs. 3 and 4, a friction surface 16 adapted to be engaged by the inner of a pair of friction discs 17, through which power is transmitted to the driven element or clutch cylinder 11, when pressure is exerted against discs 17 to cause sufficient frictional engagement with the surface 16. Pulley 10, in the construction shown, is adapted to rotate freely on the outboard end of shaft 12, being held thereon by a collar 18, although any other suitable mount for the pulley may be provided.

Figure 2:
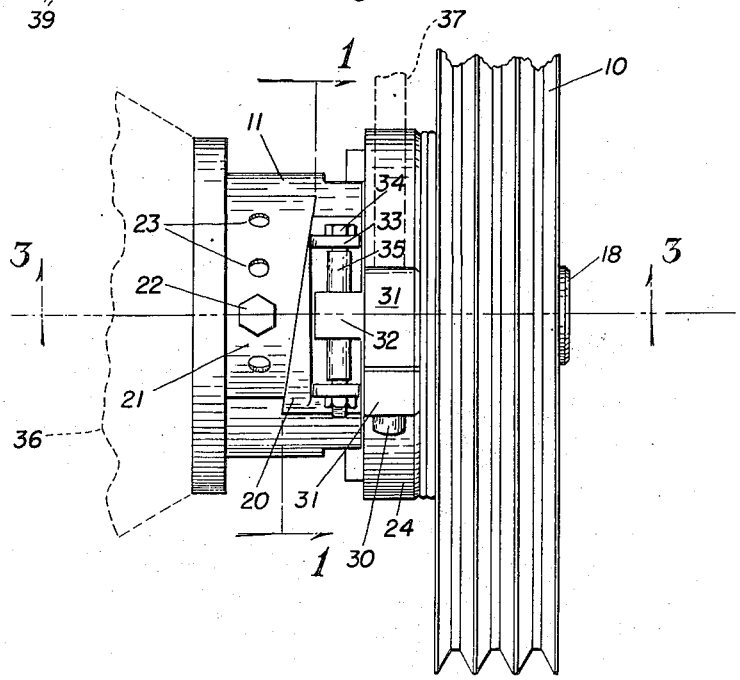
Fig. 2 is a top plan view, on an enlarged scale, of the clutch assembly of Fig. 1.

Essentially, and in accordance with this invention, the axial thrust pushing the friction discs 17 tightly against friction surface 16 is provided by a pair of cooperating wedges—a driving wedge 20 and a driven wedge 21. As in Fig. 2, these wedges are arcuate in shape, in accordance with the contour of cylinder 11, but each is circumferentially liimted, that is, extends over only a portion of the circumference of the outer surface of the cylinder. Driven wedge 21 is attached to the cylinder, as by a bolt 22, and is provided with a plurality of holes 23, through one of which bolt 22 extends, for adjustment of the position of the driven wedge to compensate for wear or for any other purpose. The driving wedge 20 is attached, through a lost-motion connection, to a torque ring 24 which, as in Figs. 3 and 4, encircles a thrust ring 25. Torque ring 24 is angular in cross section, thus providing a depending flange engaging a shoulder 26 formed at the end of cylinder 11, through the depending flange of thrust ring 25, the outer surface of the thrust ring 25 being adapted to bear against the inside of a flange 27 of torque ring 24. Flange 27 extends inwardly and friction discs 17 are riveted or otherwise secured thereto in any suitable manner. Flange 27 may be relatively thin, as shown, and provided with a number of slots 28, as in Fig. 4, to separate the flange into sections and thereby accommodate expansion due to heat developed by the friction discs.

So that torque ring 24 may be clamped on thrust ring 25 by a cap screw 30, the torque ring may be provided on one side with a radially extending boss 31, through which the ring is split. To provide the lost-motion connection between driving wedge 20 and torque ring 24, a lug 32 extends laterally from one-half of boss 31, while a pair of ears 33 extend upwardly from wedge 20. Lug 32 and ears 33 are connected by a bolt 34 which extends through ears 33 and through a bushing 35, which in turn is slidable in a hole in lug 32 on the torque ring. The lost-motion connection thereby provided permits the thrust ring to rotate slightly in either direction before the wedges are engaged or disengaged sufficiently to cause the friction between disc 17 and surface 16 to transmit power, or reduce the friction so that power is no longer transmitted.

Figure 1:
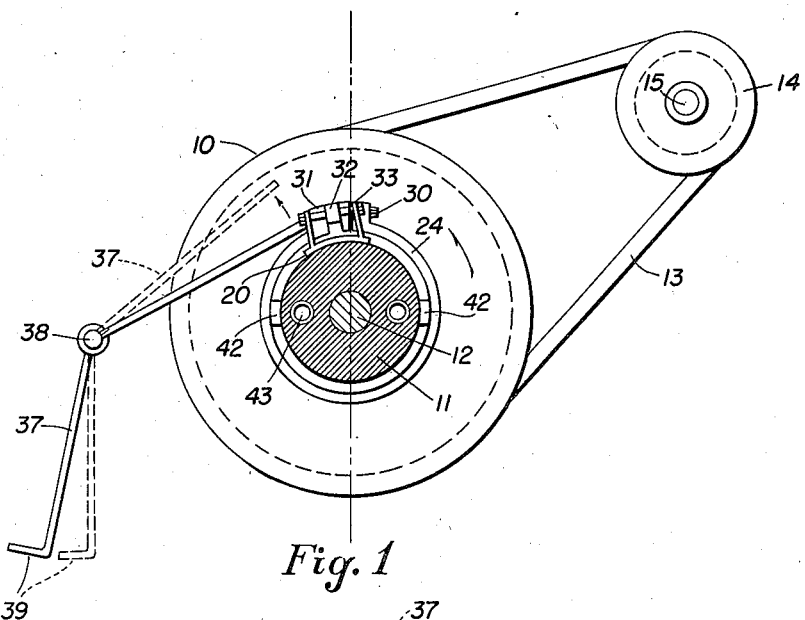
Fig. 1 is an end elevation of a clutch assembly constructed in accordance with this invention, partially in section taken along line 1—1 of Fig. 2.

Starting and stopping of the driven element or cylinder 11, to start or stop shaft 12 of a machine 36 (indicated by dotted lines in Fig. 2) is accomplished through a lever 37 of Fig. 1, which is pivoted on a pin 38. The lower end of lever 37 is provided with a foot treadle 39, for movement of the lever from the full to the dotted position of Fig. 1. When in the full position, the upper end of the lever engages the stop formed by boss 31, thereby preventing rotation of the torque ring, driven element, etc. Assuming that the lever has just been moved from the full to the dotted position of Fig. 1, by depression of treadle 39 by the operator, the restriction on rotation of torque ring 24 will be removed and the torque ring will tend to rotate with the driving element or pulley 10 until the wedges engage, thereby forcing the friction disc more closely into contact with the friction surface on the driving element. This causes power to be transmitted through the friction surfaces and torque ring 24, through the wedges to the cylinder 11, and thence to shaft 12. The lost-motion connection permits the torque ring to rotate slightly before full engagement of the wedges so as to make such engagement tighter.

Figure 4:
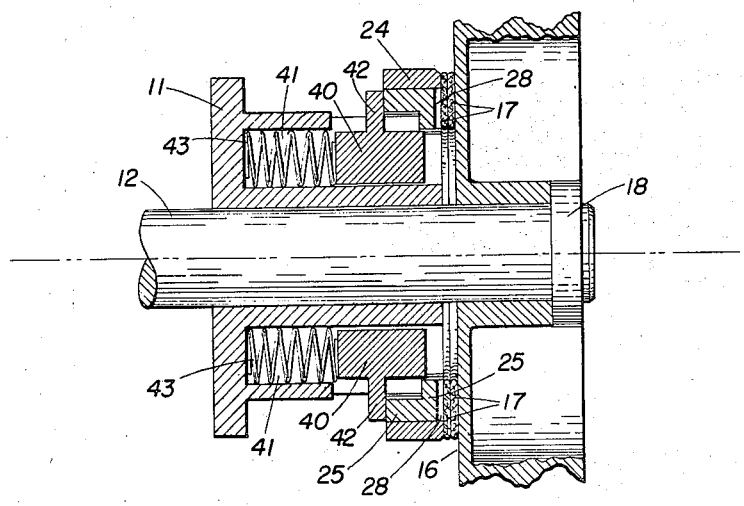
Fig. 4 is a longitudinal section taken along line 4—4 of Fig. 3.

The friction discs are held in position for instant use by pressure exerted against thrust ring 25 by plungers 40, which are movable axially in a pair of holes 41, drilled from the end of cylinder 11 and slitted along a portion of their length to accommodate ears 42 which extend outwardly to engage thrust ring 25, as in Fig. 4. The plungers are forced axially by compression springs 43 which are disposed in holes 41, but which have only sufficient capacity to maintain the thrust and torque rings in position for use, without causing power to be transmitted through the clutch, or to cause difficulty in maintaining the clutch in disengaged position by lever 37.

The plungers 40 are disposed 180° apart, and at 90° from the driven wedge 21. However, it will be understood that the position of these plungers may be altered if desired, or other equivalent means for maintaining the thrust ring and friction discs in position for instant use substituted therefor.

To disengage the clutch, as when the hammering operation is complete, it is necessary only for the operator to release treadle 39 (which action may be assisted by a suitable spring or the like) to cause the end of the lever to drop from the dotted to the full position of Fig. 1, in which position it will engage the stop formed by boss 30 and prevent further rotation of torque ring 24. When this occurs, the thrust ring and torque ring will rotate slightly with respect to cylinder 11, and the lost-motion connection will permit a slight further rotation of the driving wedge 20, but as inertia carries the driven element and driven wedge 21 slightly further, the wedges will separate and the principal force urging the friction discs against the friction surface will be removed. Therefore, the driving torque will cease to be transmitted and the clutch will be disengaged.

As will be readily apparent from the foregoing description, the clutch assembly constructed in accordance with this invention is ready for instant use, as the clutch engages practically instantly upon movement of lever 37; and substantially full power is transmitted within the first few degrees of revolution, since the lost-motion connection between the torque ring 24 and the driving wedge 20 permits the torque ring to begin rotating with the drive element or pulley 10 and provide considerable torque to urge the wedges together, thereby insuring an adequate axial thrust to force the friction discs against the friction surface 16. Also, the clutch assembly is relatively easy to control, since all that is necessary is a slight movement of the lever 37.

It will be apparent that the clutch assembly of this invention is relatively easy to construct, since the parts are relatively simple in shape and easily produced by casting or simple machining or drilling operations. Furthermore, worn parts are readily accessible for replacement, particularly the friction discs 17. Also, adjustment of the driven wedge to accommodate a greater or lesser number of discs or to compensate for wear of the discs is readily accomplished merely by removing bolt 22, moving the wedge 21 to the desired position, and reinserting and retightening the bolt.

It will be understood, of course, that although one embodiment of the invention has been described in detail, other embodiments and variations thereof may exist. For instance, instead of lever 37 and a stop provided by boss 30, a band brake operating on the outside of torque ring 24 may be provided respectively to permit rotation or stop the torque ring when the clutch is to be engaged or disengaged. Furthermore, the drive element need not be a pulley, but may be merely a disc driven by a shaft to which it is attached, or a fly wheel or other portion of driving machinery. Also, the drive element or pulley may be journaled on a separate shaft, and the torque ring may be made integral with the thrust ring, or the friction discs may be attached to a flange on the thrust ring, although it may be necessary in the latter case to key or bolt the torque ring to the thrust ring.

It will further be readily apparent that other changes than those suggested may be made without departing from the spirit and scope of this invention.

What is claimed is:

1. An axial type clutch adaptable for use with a bit sharpening machine or the like, comprising a driving element providing a friction surface; a driven element; a thrust ring rotatable with said driven element but movable circumferentially with respect thereto; a torque ring encircling said thrust ring and clamped thereto, said torque ring having a radially extending stop and also having an inwardly extending flange; friction disc means attached to said torque ring flange and adapted to engage said friction surface; a driving wedge adapted to be rotated by said torque ring and attached thereto by a lost-motion connection; a driven wedge attached to said driven element and adapted to engage said driving wedge upon relative circumferential movement of said wedges in the direction of rotation to force said torque ring and friction disc means toward said driving element and thereby produce sufficient frictional engagement between said friction disc means and said friction surface to cause said driven element to rotate with said driving element; a pair of axially movable plungers mounted on said driven element in spaced relation to said driven wedge and adapted to engage said thrust ring; and a spring for each plunger mounted on said driven element for forcing said plungers against said thrust ring.

2. In an axial type clutch for transmitting power from a driving element to a driven element through the engagement of a friction element with a friction surface, the improvement which comprises a torque ring carrying a friction element; a pair of wedges adapted when engaged to force said friction element against said friction surface, said wedges being engageable and disengageable by movement of said torque ring; and means for selectively retarding movement of said torque ring.

3. In an axial type clutch as defined in claim 2, including a lost-motion connection between said torque ring and one of said wedges.

4. In an axial type clutch for transmitting power from a driving element to a driven element through the engagement of a friction element with a friction surface, the combination of a pair of wedges adapted when engaged to force a friction element against a friction surface; a torque ring for carrying said friction element, one of said wedges being movable with said torque ring; means for selectively retarding movement of said torque ring to effect selective engagement and disengagement of said wedges; and resilient means for maintaining said friction element in such a position relative to said surface as to cause relatively quick and positive transmission of power upon engagement of said wedges.

5. In an axial type clutch as defined in claim 4, including a lost-motion connection between said ring and wedge movable therewith.

6. In an axial type clutch as defined in claim 4, in which one wedge is attached to said torque ring by a lost-motion connection and the other wedge is attached to said driven element and adjustable circumferentially thereof.

7. In an axial type clutch for transmitting power from a driving element to a driven element through the engagement of a friction element with a friction surface, the combination of a pair of circumferentially limited wedges adapted when engaged to force a friction element against a friction surface; means rotatable with respect to either said driven element or said driving element for carrying said friction element and adapted to rotate one wedge into and out of engagement with the other wedge; and stop means selectively engageable with said rotatable means to effect engagement and disengagement of said wedge.

8. In an axial type clutch as defined in claim 7, wherein said stop means comprises a pivoted lever one end of which is adapted to engage a stop formed on said rotatable means.

9. An axial type clutch adaptable for use with a bit shaping machine or the like, comprising a driving element providing a friction surface; a driven element including a clutch cylinder; a thrust ring rotatable with respect to said cylinder but movable circumferentially with respect thereto; a torque ring clamped on said thrust ring and having a radially extending stop and also having a relatively thin inwardly extending flange disposed against said thrust ring; a friction ring attached to said flange and adapted to engage said friction surface; a circumferentially limited driving wedge adapted to be rotated by said thrust ring and attached thereto by a lost-motion connection; a circumferentially limited driven wedge attached to said driven element and adapted to engage said driving wedge upon relative circumferential movement of said wedges in the direction of rotation to force said friction ring toward said driving element and thereby produce sufficient frictional engagement between said friction ring and said friction surface to cause said wedges and driven element to rotate with said driving element; a pair of axially movable plungers mounted in axial holes in said clutch cylinder in spaced relation to said driven wedge and having ears adapted to engage said thrust ring; a spring for each plunger disposed in said axial holes for forcing said plungers against said torque ring; and a pivoted lever one end of which is adapted to be moved in one direction to engage said radial stop on said torque ring to prevent rotation of said torque ring and disengagement of said wedges, said lever being adapted to be moved in the opposite direction to disengage said stop and permit rotation of said thrust ring to effect engagement of said wedges.

10. In an axial type clutch for transmitting power from a driving element to a driven element through the engagement of a friction element with a friction surface, the combination of a pair of arcuate wedges mounted exteriorly of the clutch and adapted when engaged to force a friction element against a friction surface; a torque ring for carrying said friction element, one of said wedges being movable with said torque ring, means for selectively retarding movement of said torque ring to effect selective engagement and disengagement of said wedges; and resilient means for maintaining said friction element in such a position relative to said surface as to cause relatively quick and positive transmission of power upon engagement of said wedges; one of said wedges being adapted for adjustment to compensate for wear.

11. In an axial type clutch as defined in claim 10, in which one wedge is accessible upon the exterior of said clutch for replacement without having to remove any other part of said clutch.

12. In an axial type clutch for transmitting power from a driving element having a friction surface to a driven element through the engagement of a friction element with the friction surface, the improvement which comprises a torque ring and a friction element in association therewith; a pair of arcuate wedges adapted when engaged to force said friction element against the friction surface of said driving element, the arcuate wedges being shifted into and out of engagement by movement of the torque ring; and means for selectively retarding movement of said torque ring.

13. In an axial type clutch for transmitting power from a driving element having a friction surface to a driven element through the engagement of a friction element with the friction surface, the combination of a torque ring provided with a stop boss and carrying the friction element; a pair of arcuate driving wedges adapted when engaged to force said friction element against said friction surface; means engageable with the stop boss for selectively retarding movement of said torque ring to effect selective engagement and disengagement of said wedges; and resilient means associated with the driven element of the clutch for maintaining the friction element in such a position relative to the friction surface as to cause relatively quick and positive engagement of said driving wedges when said first-named means is moved out of engagement with said stop boss.

LOYD ALVIN WHITE.

REFERENCES CITED

The following references are of record in the file of this patent:

UNITED STATES PATENTS

| Number | Name | Date |
|--------|------|------|
| 203,808 | Williamson | May 14, 1878 |
| 260,460 | Deschamps | July 4, 1882 |
| 787,072 | Brush | Apr. 11, 1905 |
| 1,974,390 | Eason | Sept. 18, 1934 |
| 2,061,787 | Warner | Nov. 24, 1936 |